Figure 1:
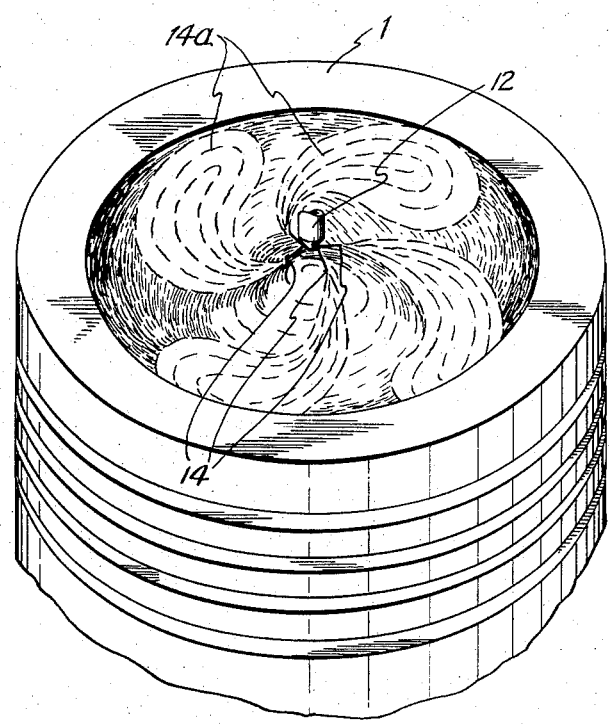

Nov. 24, 1959     J. LIEBEL     2,914,044
SELF-IGNITING COMBUSTION ENGINE
Filed Sept. 5, 1956     3 Sheets-Sheet 1

INVENTOR
Julius Liebel

Nov. 24, 1959  J. LIEBEL  2,914,044
SELF-IGNITING COMBUSTION ENGINE
Filed Sept. 5, 1956  3 Sheets-Sheet 2

INVENTOR
Julius Liebel

BY
Bailey, Stephens & Huettig
ATTORNEYS

INVENTOR
Julius Liebel

BY
Bailey, Stephens & Huettig
ATTORNEYS

United States Patent Office

2,914,044
SELF-IGNITING COMBUSTION ENGINE

Julius Liebel, Nurnberg, Germany, assignor to Maschinenfabrik Augsburg-Nurnberg AG., Nurnberg, Federal German Republic, a firm Application September 5, 1956, Serial No. 608,066

Claims priority, application Germany September 7, 1955

10 Claims. (Cl. 123—32)

This invention relates to an air-compressing self-igniting internal combustion engine, more particularly a high-speed diesel engine, of the type having a combustion chamber which is separated from the cylinder chamber and constructed as a torus-shaped annular chamber with a ridge- or nipple-shaped central elevation, above which the injection nozzle is arranged in the cylinder head.

It is an object of the invention to apply to an internal combustion engine with a combustion chamber of the above-mentioned kind the method described in the U.S. patent application Ser. No. 480,432 for a high-speed diesel engine with a combustion chamber provided in the piston and generated by rotation of a curved line and with an injection nozzle arranged in the cylinder cover in an inclined eccentric position. According to this known process the fuel is not injected into the combustion air in a liquid atomized form and directly mixed with air, but the fuel is injected onto the wall of the combustion chamber without previous atomisation, in the form of one or more solid fuel jets with a short free length of the jet and in tangential direction with respect to said wall in such a way that the injected fuel will extend in the form of a very thin film over a large part of the wall surface. By an air flow rotating substantially unidirectionally to the injection of the fuel and being imparted a high kinetic rotary energy by initial starting of the air rotation already with the air entering into the cylinder and increasing same by displacement into the combustion chamber which is restricted compared to the cylinder diameter, the fuel vaporizing from the wall of the combustion chamber is gradually released from the wall as it vaporizes, mixed with the air and burnt.

The combustion chamber described in the U.S. patent application Ser. No. 480,432 having a shape generated by rotation of a curved line, with eccentrically arranged injection nozzle, represents a very suitable and advantageous shape of the combustion chamber for carrying out the method described in said application. However, with large stroke volumes per cylinder the use of for instance only one injection nozzle arranged eccentrically to the combustion chamber axis may cause difficulties in so far as under the usual injection conditions it is not possible to bring with a single nozzle a sufficient amount of fuel onto the available wall surface of the combustion chamber in the desired fine film-distribution. If for all that it is intended to do with a single injection nozzle the danger exists, in view of the larger amount to be injected per unit of time, that the film of fuel applied on the wall of the combustion chamber will become too thick, so that a too long vaporizing time would result for high speeds. Moreover, it would be necessary in this case to use higher injection pressures in order to increase the wetted wall surface; hereat, however, the further danger exists that the proportion of fuel distributed in the air becomes larger than required for ensuring the ignition. The knocking tendency of the engine would be increased thereby.

On the other hand, if with eccentric arrangement of the nozzle more than a single injection nozzle is used, it is difficult to control the amount of fuel injected through each nozzle if—as it is desirable for reasons of economy—only one pump element is associated to several nozzles.

It is the object of the present invention, therefore, to wet by means of a single centrally arranged injection nozzle a sufficiently large wall surface of the combustion chamber available as a vaporizing surface with fuel in the form of a film even with large stroke volumes and cylinder units, i.e. in such a manner that the thickness of the fuel film remains very thin at all points wetted, with maximum extension thereof.

According to the invention this task is solved, using a per se known torus-shaped annular combustion chamber with a central elevation with arrangement of the injection nozzle in the cylinder head above this elevation, by injecting the fuel in several solid fuel jets issuing from the nozzle, each jet having a short free length and impinging upon the wall surface at an acute angle, in such a way that it is tangentially deposited on the wall of the central elevation so that the fuel spreads over a large surface up to the outer wall of the annular chamber in the form of a very thin film, thereby producing in the cylinder and combustion chamber an air circulation about the cylinder or combustion chamber axis of such a kinetic rotary energy that the fuel deposited on the wall of the combustion chamber in the form of a film is released from the wall in the course of its vaporization, mixed with the air and burnt.

According to another feature of the invention the combustion chamber has a toroidal shape in which the central elevation preferably forms a flat stretched cone on whose shell fuel jets are radially distributed at a "sliding angle" directly, i.e. with a short free length of the jet and preferably at an inclined angle to the generatrix of the shell of the cone, i.e., conoidal to the axis of rotation of the combustion chamber.

The term "at a sliding angle" is to be understood in such a way that the fuel jets issuing from the injection nozzle and impinging onto the wall of the central elevation immediately after their leaving the nozzle orifices, i.e., on the shortest possible way, intersect the shell of the cone of the central elevation which is stretched to a large length, asymptotically so to say or, more exactly, tangentially. Hereby, the possibility results to give the fuel jets a direction towards the shell of the cone which ensures any desired extension of the fuel film on this cone-shaped shell.

The internal combustion engine according to the invention is further characterized by the following features: The conically shaped shell of the central elevation may either be truncated or end in a non-truncated point. The radially distributed fuel jets, if directed conoidally to the axis of rotation of the combustion chamber, preferably form a conoidal angle of 30–60° with the generatrix of the cone-shaped shell.

The movement of the air in the toroidal combustion chamber according to the invention is provided in such a way, in per se known manner, that it takes place in the form of an air rotation of a high-speed about the axis of the combustion chamber and thus about the central elevation. Hereat, known twisting means such as a valve with deflector or a twisting channel may serve as guiding elements, for starting an initial air rotation already as the air flows into the cylinder, with an intensity which is considerably increased in the combustion chamber itself by the squeezing effect in the compression stroke.

The air rotation produced in this manner according to further features of the invention may be uni-directional to the conoidally deflected fuel injection or in a counter direction thereof. The latter method is of a certain importance for improving the conditions for starting with cold engine, since the proportion of fuel distributed in the air is somewhat increased thereby.

The arrangement according to the invention offers the advantage that a plurality of jets of fuel can be applied on the wall of the combustion chamber to form a film, respectively, with circular distribution of these films over the periphery of the combustion chamber, whereby the demand for a larger quantity of fuel injected with large stroke volumes per cylinder unit is satisfied while forming the mixture during the injection in accordance with the method disclosed in U.S. patent application Ser. No. 480,432.

Other and further objects, features and advantages of the invention will be pointed out hereinafter and appear in the appended claims forming part of the application.

In the accompanying drawings a now preferred embodiment of the invention is shown by way of illustration and not by way of limitation. All parts not essential for the invention have been omitted.

Figure 2:
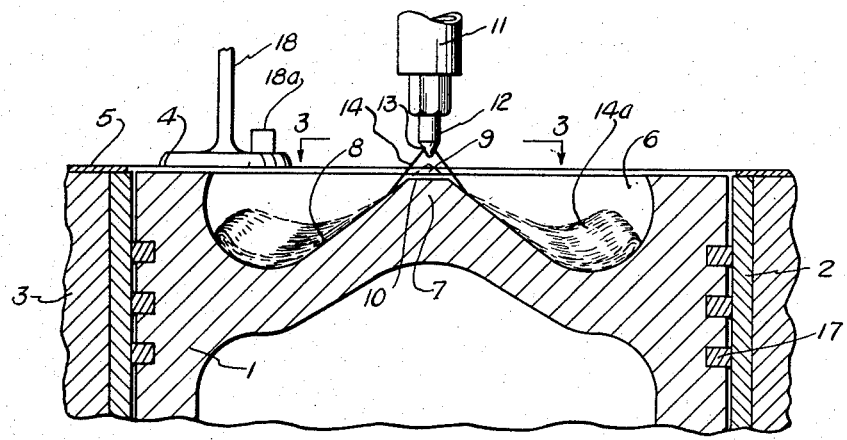
Figure 3:
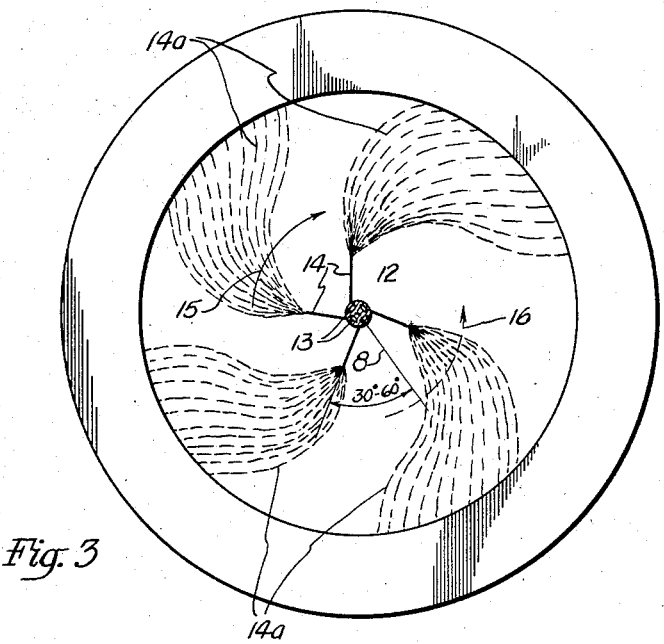
Figure 4:
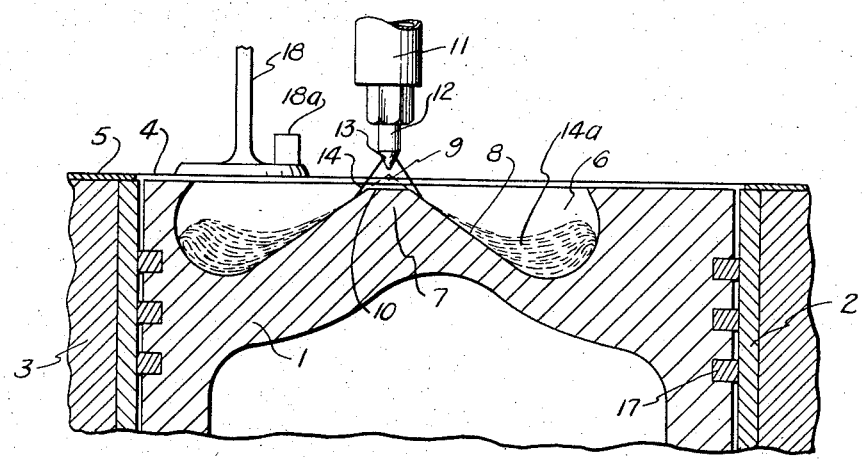
Figure 5:
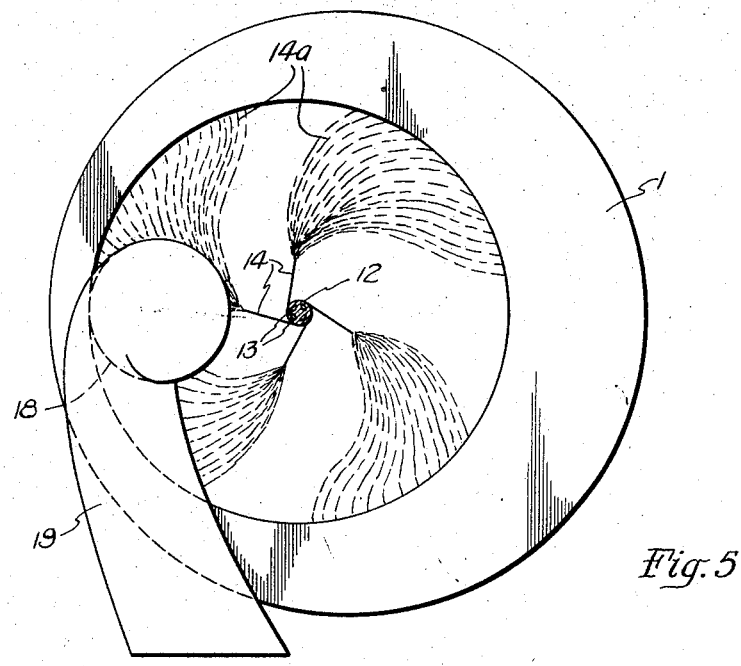

Fig. 1 is a perspective view on a toroidal annular combustion chamber provided in the piston head, indicating the mouth-end of the injection nozzle disposed above the central elevation, Fig. 2 is an enlarged axial section of the piston of an internal combustion engine with annular combustion chamber arranged therein and injection nozzle arranged above the central elevation, Fig. 3 is a plan view on the mouth of the nozzle and the combustion chamber and section according to line 3—3 of Fig. 2, Fig. 4 is a section similar to Fig. 2, but showing an eccentric arrangement of the combustion chamber, and Fig. 5 is a plan view of Fig. 4, showing also the spiral-shaped air intake channel.

Similar reference numerals denote similar parts in the different view.

In the drawings the piston 1 with its piston rings 17 is arranged to reciprocate in the cylinder liner 2 fixedly seated in the cylinder 3. The upper dead center position of the piston 1 is indicated by a line 4 defining the lower surface of the cylinder cover which has been omitted, and by packing elements 5. The combustion chamber 6 is formed by a toroidal recess in the piston head with a central elevation 7 which may be in the form of a nipple or ridge and in the example is shaped as a flat conically-shaped shell. The generatrix 8 of the conical shell of the elevation 7 forms a straight line or nearly a straight line. The conical shell of the elevation 7 either ends in a non-truncated point 9 or it may be slightly truncated as indicated at 10. The injection nozzle 11 designed as a multi-bore nozzle arranged coaxial to the combustion chamber 6, i.e. in such a way that its mouth end 12 is above, and in the upper dead centre position just above, the point 9 or the top 10 of elevation 7. The fuel jets 14 are ejected directly, i.e. with a short free length between the orifices 13 where they leave the nozzle 11 and the spots where they impinge on the conical surface or shell of the elevation 7, at a sliding, i.e. tangential angle of incidence from the apertures 13 in a radial or circular distribution, referring to the circumference of the combustion chamber, onto said conical shell surface, the direction of injection of these fuel jets forming preferably a conoidal angle of about 30 to 60° with the generatrix 8 of the conical shell surface. The fuel films thereby formed on the wall of the combustion chamber are indicated at 14a. The fuel jets 14 thus are directed so as to say asymptotically or, more exactly, tangentially to the conical shell surface of the elevation 7, and the direction of injection of these jets on the conical shell corresponds preferably to the generatrix of a conoid about the axis of rotation of the combustion chamber 6 or of the elevation 7, respectively. The direction of injection, however, may also be strictly radial, if desired, i.e., without any angle of deflection in relation to the generatrix of the conical shell of the elevation 7.

The air flow associated to the process of depositing the fuel on the wall in accordance with the invention is indicated in the drawing by the arrows 15 and 16. The arrow 15 shown in full lines illustrates an air rotation which is substantially unidirectional to the deposition of fuel jets 14 on the wall, while the arrow 16 shown in dot- and dash lines indicates an air rotation opposed to the injection or deposition of the fuel. As means for this for example in Fig. 2 is shown an intake valve 18 having a deflector 18a. Instead of such a masked valve there may be also provided a spiral-shaped intake channel, as shown at 19 in Fig. 5. These means are known per se and therefore need not be described in greater detail.

In Figs. 1 and 3 the formation of the films with conoidally extending deposition of the fuel jets on the conical shell of the elevation 7 is indicated by the hatching 14a drawn apart fan-fashion, the scattering influence of the uni-directional air rotation being indicated by the curvature of the dotted lines and acting to spread the fuel over a large surface.

By the deposition of the fuel jets said deposition issuing from the point 9 or top 10 and taking place preferably conoidally to the axis of the combustion chamber on the diverging conical shell of the central elevation 7, a surface of maximum size of the combustion chamber is wetted by the fuel in the form of a finely distributed film. By the long slowing path of the fuel jets even at the curved turning points of the combustion chamber only flowing fuel arrives which is already finely distributed into a thin layer, so that there are nowhere spots in the combustion chamber where an insufficient vaporization could occur owing to accumulation of fuel particles in an inadmissibly large thickness of the fuel layer. The large surface vaporization attainable according to the invention thus permits in a promising manner the application of the process underlying the invention, even in case of large combustion chambers or stroke volumes per cylinder.

The invention is not limited to the embodiment therein shown. Any nozzle positions are possible, provided only that care is taken that the mouth of the nozzle with upper dead center position of the piston is above the point or top of the central elevation 7 and that the deposition of the fuel on the wall is effected in accordance with the invention. On the other hand, the entity of annular combustion chamber and injection nozzle arranged centrally thereabove instead of being coaxially arranged as shown in the example may also be arranged eccentrical to the cylinder axis, as shown in Figs. 4 and 5, wherein similar reference numerals denote similar parts as in Figs. 1–3, so that no further explanations will be required.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

I claim:

1. An air-compressing, self-igniting internal combustion engine comprising a cylinder, a cylinder head, a piston, a combustion chamber which is separated from the cylinder space, said combustion chamber being constructed as a torus-shaped annular chamber having a central elevation, a fuel injection nozzle with outlet orifices mounted in the cylinder head above the elevation, said nozzle orifices being directed so that the fuel is injected tangentially onto the wall of the central elevation in the form of several solid fuel jets issuing from the nozzle with a short length of each free jet and an acute angle of incidence in relation to the wall of the elevation and each jet spreads over a large surface up to the outer wall of the annular chamber in the form of a very thin film, and means for producing in the cylinder space an air rotation about the axis of the cylinder and of the combustion chamber of such a kinetic energy of rotation that the fuel films deposited on the wall of the combustion chamber are thereby released from the wall in the course of their vaporization, mixed with the air, and burnt.

2. An internal combustion engine as in claim 1, said annular combustion chamber being in the shape of a toroid in which the central elevation forms a flat extended cone and the centrally arranged nozzle is designed in such a way that radially distributed solid fuel jets immediately after leaving the nozzle travel a short path at an angle to said surface and impinge on said surface.

3. An internal combustion engine as in claim 2, said shell of the cone of the central elevation ending in a non-truncated point.

4. An internal combustion engine as in claim 2, said shell of the cone of the central elevation ending in a truncated top.

5. An internal combustion engine as in claim 2, said nozzle orifices being directed in such a way that the fuel jets are radially distributed conoidally to the center axis of the combustion chamber and form a conoidal angle of 30 to 60° with the generatrix of the shell of the cone.

6. An internal combustion engine as in claim 2, said means for producing an air rotation comprising a valve with deflector for imparting a circulating movement to the air introduced into the cylinder and the combustion chamber.

7. An internal combustion engine as in claim 5, said nozzle and the means for producing in the cylinder space an air rotation being mounted so that the fuel jets are introduced substantially unidirectional with the air rotation.

8. An internal combustion engine as in claim 5, said nozzle and the means for producing in the cylinder space an air rotation being mounted so that the fuel jets are opposed to the air rotation.

9. An internal combustion engine as in claim 1, said annular combustion chamber and the injection nozzle being positioned coaxial to the axis of the cylinder.

10. An internal combustion engine as in claim 1, said annular combustion chamber and the injection nozzle being positioned eccentrical to the axis of the cylinder.

References Cited in the file of this patent

FOREIGN PATENTS 438,167    Great Britain _____ Nov. 12, 1935